(12) United States Patent
Metzler et al.

(10) Patent No.: US 6,682,163 B2
(45) Date of Patent: Jan. 27, 2004

(54) METHOD AND DEVICE FOR DETECTING AND CORRECTING CHROMATIC ABERRATIONS IN MULTICOLOR PRINTING

(75) Inventors: Patrick Metzler, St. Wendel (DE); Ralph Petersen, Kiel (DE)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 10/178,984

(22) Filed: Jun. 25, 2002

(65) Prior Publication Data

US 2003/0002891 A1 Jan. 2, 2003

(30) Foreign Application Priority Data

Jul. 2, 2001 (DE) .......................... 101 31 957

(51) Int. Cl.[7] .......................... B41J 29/393; B41J 2/385
(52) U.S. Cl. .......................... 347/19; 347/116
(58) Field of Search .......................... 347/19, 14, 23, 347/5, 4, 12, 11, 3, 116, 115, 9; 355/326; 399/301, 39, 40, 115, 116

(56) References Cited

U.S. PATENT DOCUMENTS

| 5,287,162 A | 2/1994 | DeJong et al. .......... 355/326 R |
| 5,384,592 A | 1/1995 | Wong .......................... 346/157 |
| 6,317,147 B1 * | 11/2001 | Tanaka ....................... 347/116 |

FOREIGN PATENT DOCUMENTS

| JP | 01112266 A | 4/1989 | .......... G03G/15/01 |
| JP | 044149479 A | 5/1992 | .......... G03G/15/01 |
| JP | 11231586 A | 8/1999 | .......... G03G/15/00 |
| JP | 11237778 A | 8/1999 | .......... G03G/15/01 |

* cited by examiner

Primary Examiner—Raquel Yvette Gordon
Assistant Examiner—Charles W. Stewart, Jr.
(74) Attorney, Agent, or Firm—Lawrence P. Kessler

(57) ABSTRACT

Detection of crosstrack aberrations of registration marks in order to prevent color errors during multicolor printing. The detection of crosstrack aberrations of registration marks is with a single sensor which detects each triangle as a registration mark per color selection, whereby the triangles are each assigned a color of the multicolor printing. Sensor values are detected and formed from these differential values.

6 Claims, 3 Drawing Sheets

METHOD AND DEVICE FOR DETECTING AND CORRECTING CHROMATIC ABERRATIONS IN MULTICOLOR PRINTING

FIELD OF THE INVENTION

This invention relates to a method and a device for detecting crosstrack registration errors in a multicolor printing apparatus and applying correction based on error values.

BACKGROUND OF THE INVENTION

In the printing industry for multicolor printing, multicolor printing is distinguished in particular by a superposition of individual color separations on an assembly, which are perceived by the human eye on the ultimate stock in various shades, concentrations and brightnesses. It is important that the individual color separations, normally yellow, cyan, magenta and key or black are precisely arranged on top of each other, because otherwise, the ultimate printing may show visible color defects on the stock, i.e., the stacked superposition of the individual color separations affects the printing quality in various ways. Such defects may be manifested in displaced color lines on the printed object. Various methods are thus provided to precisely arrange (in the order of micrometers) the color separations on top of each other. For this purpose, color registration marks are used as reference or comparison indices, which can be used to set chromatic aberrations in a vertical (intrack) or horizontal (crosstrack) direction.

For example, U.S. Pat. No. 5,384,592 contains an image-forming device to transfer a plurality of images, a first image-forming station to form a first registration mark on the image-transferring device and a second image-forming station to form a second registration mark on the image-transferring device. Furthermore, the image-forming device contains an imaging sensor to determine the position of the geometric focal point of the first and second registration mark with respect to an individual spatially fixed reference point, a segment to determine an erroneous alignment of the second image-forming station on the basis of the position of the second registration mark in relationship to the first registration mark, and a segment to correct the erroneous alignment of the second image-forming station. The erroneous alignment is determined in this case by two sensors and an arrangement of each of the two registration marks per color separation.

U.S. Pat. No. 5,287,162 discloses a method and a device for correcting color registration errors. A detection system includes a marking device to apply a chevron of a first printer on a carrier, a second chevron of a second printer and a third chevron from the first as well as the second printer. The third beam has a first component from the first printer and a second element from the second printer. The detection system further contains a detection device for calculating a time matrix with three time slots, whereby each time slot corresponds to a relevant passage of time of the first, second and third chevron through the detection device. The detection system further contains a detection device for determining the alignment error on the basis of a function of three time slots. A control system includes a marking device to apply a chevron of the first printer on a carrier, a second chevron of a second printer and a third chevron from the first as well as from the second printer. The control system further contains a detection device for determining a time matrix with three time slots, whereby each time slot corresponds to a relevant passage of time of the first, second and third chevron through the detection device, a detection device for determining the alignment error on the basis of a function of the time slots and a control device to minimize the alignment error. To this end, the detection device consists of at least two sensors.

One disadvantage of both apparatus described in the above patents is, inter alia, that at least two sensors, as well as a plurality of geometric objects, are used as registration marks for each color separation, in order to measure aberrations of the registration marks.

SUMMARY OF THE INVENTION

It is accordingly a purpose of this invention to detect, in a multicolor printing apparatus, crosstrack aberrations of the registration marks in an easy and cost effective way with low use of components and low computer expense independent of intrack aberrations. Registration mark sensor values are advantageously detected by counting cycles with high frequency. A counting cycle to determine a sensor value begins with a light/dark transition of a registration mark and ends with a light/dark transition of the same registration mark lying on the opposite side, i.e., at the edges of a registration mark. Subsequently, a new counting cycle is started, which begins at the edge of the following registration mark at which a light/dark transmission is present and ends on the opposite edge of the registration mark, i.e., the following light/dark transmission. All that is required for a precise detection of a sensor value is the two results of the above-described counting cycle for each registration mark. It thus follows that, in order to detect possible registration errors for each registration mark according to the determination of a differential value from the sensor values, only the two counting results and the differential value are required.

Furthermore, the crosstrack aberrations can be corrected with an advantageous embodiment, whereby first the differential values are determined from the sensor values, by which the differential values of the crosstrack aberrations and the corresponding correction values are calculated and the crosstrack aberrations are ultimately corrected on the basis of the correction values.

The correction values calculated to correct the crosstrack aberrations may be transferred to a control device. For example, the control device is changed by the alignment of a marking device for the application of colored images on a printing drum in such a way that the crosstrack aberrations are essentially corrected in the micrometer range. The result is that the color separations on the individual printing drums with successive printing phases are essentially precisely arranged on top of each other and, as a result, color errors in the final printing are prevented.

The control device for correcting the crosstrack aberrations may be contained in a preferred embodiment in the sensor device. Thus, savings can be made in components and transferal processes. Crosstrack aberrations are calculated in the sensor device and corresponding correction values are transferred to the control device, which controls the alignments of a conveyor belt and/or a marking device of the multicolor printing apparatus.

The invention, and its objects and advantages, will become more apparent in the detailed description of the preferred embodiment presented below.

BRIEF DESCRIPTION OF THE DRAWINGS

Below, the invention is described in an exemplary fashion on the basis of the attached FIGS. 1 through 4. Shown are.

DETAILED DESCRIPTION OF THE INVENTION

Figure 1:
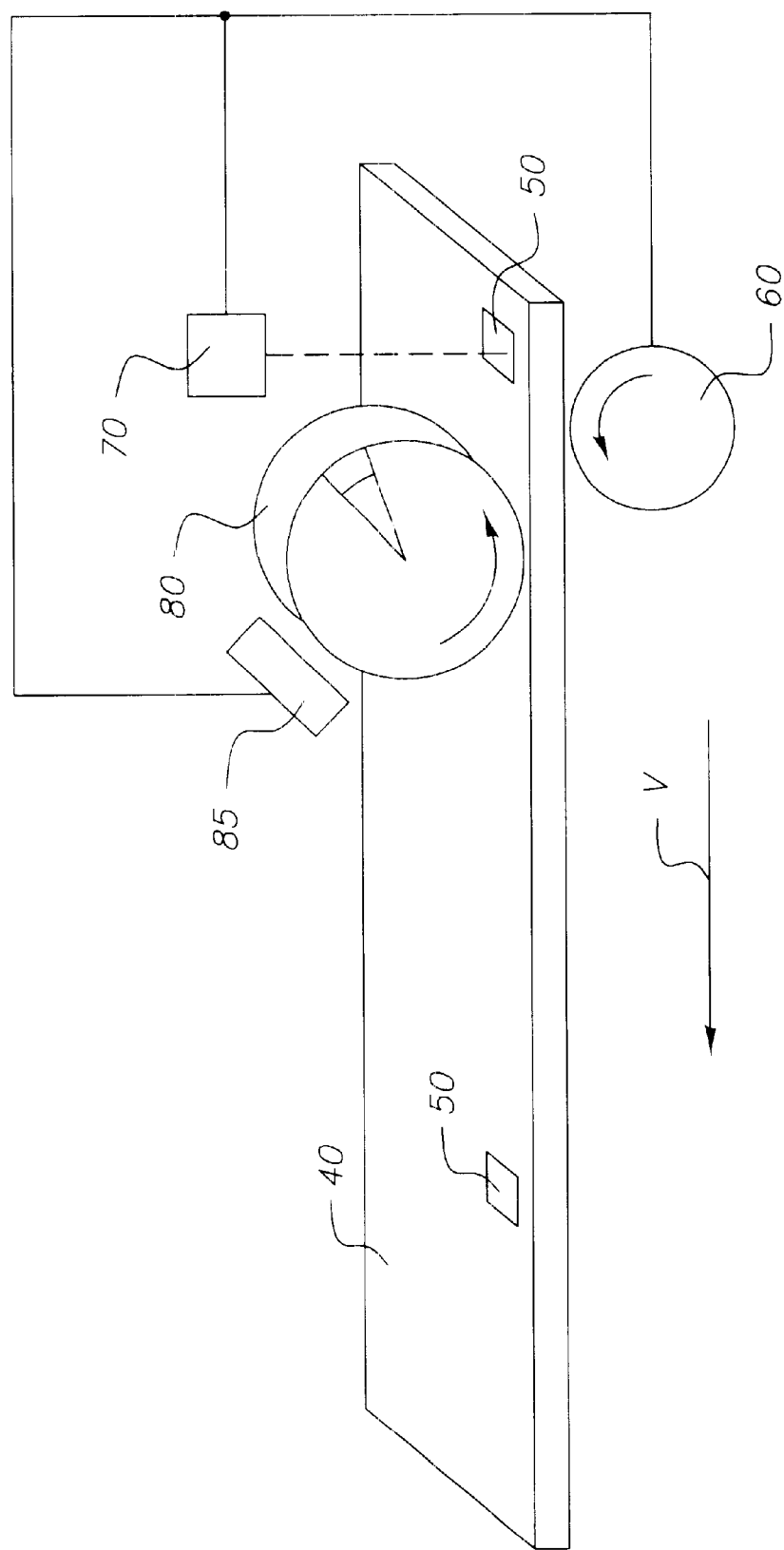
FIG. 1 which is a schematic drawing of a device according to one embodiment of the invention for detecting and correcting chromatic aberrations with a conveyor belt, which is driven by a control device, and with applied registration mark areas with registration marks, which are scanned by a sensor device.

FIG. 1 shows a schematic drawing of a section of a conveyor belt 40 of a printing apparatus (not shown) for multicolor printing. The conveyor belt 40 is usually a continuous belt, but which is illustrated in a planar fashion here, and which is shown as being transparent. The conveyor belt 40 can fulfill transport functions as well as replacing other printing block patterns as the carrier of latent images. A printing drum 80 represents the printing block module for a certain color separation, whose other printing modules, of which there are normally three additional modules with four-color printing, are not shown in FIG. 1. Furthermore, registration mark areas 50 are arranged on the conveyor belt 40 with registration marks (10, 11, 12, and 13 in FIG. 2, 20, 21, 22, and 23 in FIG. 3, and 30 in FIG. 4). The registration mark areas 50 are represented in FIG. 1 as rectangles, which are scanned with signals by a sensor device 70 arranged above the conveyor belt 40. The conveyor belt 40 is operated by a highly sensitive control device 60, which reach sensitivities in the micrometer range with the propulsion of the conveyor belt 40.

The control device 60 in FIG. 1 is rotated in the direction of the curved arrow. The control device 60 is connected with a marking device 85 as well as with the sensor device 70 and drives the conveyor belt 40 with highly consistent speed. Furthermore, the control device 60 is used as a central clock pulse generator for the printing device. The surface of the printing drum 80 receives an image of a color separation formed by electrostatic forces on toner so as to remain on the surface of the printing drum 80, usually magenta, cyan, yellow or key, which developed color separation image is transferred extremely precisely to a stock. The printing drum 80 can be driven by friction or it may have its own drive. This embodiment describes a printing drum 80 with its own drive, controlled by the control device 60.

The sensor device 70 sends signals (represented in FIG. 1 by dotted lines) to the registration mark areas 50 and receives reflected signals back from these registration mark areas. The configuration of the registration mark areas 50 is described below with references to FIGS. 2 through 4. The sensor device 70 is configured so that the light/dark transition of the registration marks to the conveyor belt 40 in the registration mark areas 50 facing their carrier can be determined, and to determine clock pulse intervals in which the signals between the light/dark transitions are located. By clock pulse intervals of the signals determined, the control device 60, with the help of the extremely precise clock pulse generation of the control device 70, calculates the corresponding distance or interval covered by the light/darkness transition.

A computer device associated with the sensor device 70 compares the actual distance or interval covered for certain highly precise speeds ($y_1, \ldots,$ n in the FIGS. 2 through 4) with target values $Y_{SOLL(target)}$ of the distances or intervals for certain extremely precise speeds of the conveyor belt 40. If the distances or intervals ($y_1, \ldots,$ n in the FIGS. 2 through 4) determined in the sensor device 70 match the target values $Y_{SOLL(target)}$ of the distances or intervals, it is thus guaranteed that the registration marks will definitely pass extremely precisely through the sensor device 70 horizontally (crosstrack) to the movement direction of the conveyor belt 40. A correction must not be made. If, however, measurable distances between the distances or intervals ($y_a, \ldots,$ n in the FIGS. 2 through 4) occur, the sensor device 70 calculates from these correction values, converting them into a corresponding number of clock pulses and transmits this number of clock pulses to the control device 60.

The detection and correction for each registration mark 10, 11, 12, 13, 20, 21, 22, 23 and 30 is individually carried out. In the case below, the correction of crosstrack aberrations, i.e., aberrations of the registration marks 10, 11, 12, 13, 20, 21, 22, 23 and 30 horizontal to the transport direction of the conveyor belt 49 with stock and the horizontal direction that leads to the color separations to the stock is described. It must be ensured that an intrack aberration, i.e., an aberration of the registration marks 10, 11, 12, 13, 20, 21, 22, 23 and 30 in the direction of the conveyor belt 40 and in the direction of the arrows designated with v, which does not occur in the embodiment described, but which is corrected in the known way, where necessary.

The determination of crosstrack aberrations is explained in detail with reference to FIGS. 2 through 4. It is assumed in this case that the crosstrack aberrations are determined with the standard number of clock pulses, which are converted into distances in accordance with the existing description, which can be used for the alignment of the marking device 85. These distances are transmitted to the control device 60, the signals are sent to the marking device 85 and cause the marking device 85 to be moved accordingly in the axial direction to the printing drum 80. This process corrects the crosstrack aberrations, and the colored in image of the color separation on the printing drum 80 is consequently displaced to the right or left accordingly. As a result, the respective color separation is applied essentially to the stock without crosstrack aberrations.

In the same way, the exemplary embodiment according to FIG. 1 detects and corrects crosstrack aberrations of the registration marks 10, 11, 12, 13, 20, 21, 22, 23 and 30 assigned to the other colors, whose assigned printing drum in FIG. 1 is not shown. The control device 60 and the sensor device 70 are combined with the respective marking devices 85 in this instance, of which only one is shown in FIG. 1.

Figure 3:
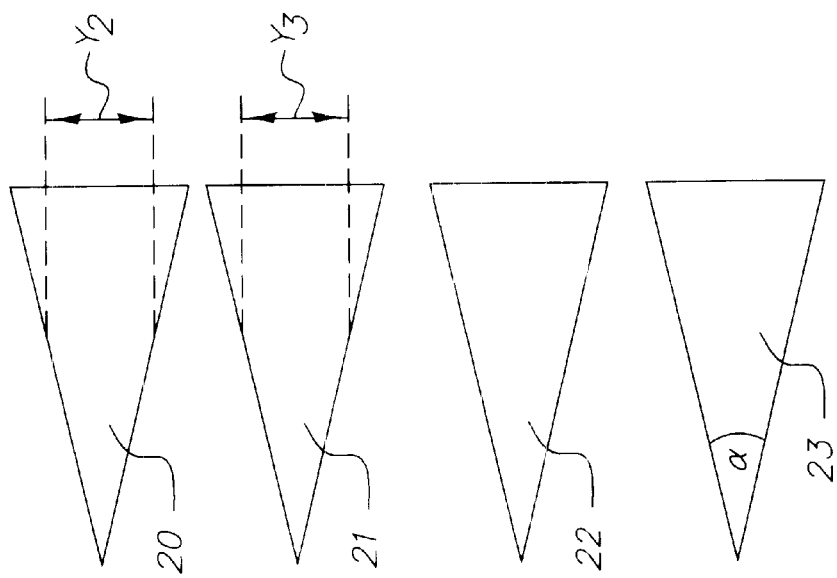
FIG. 3 which is a schematic drawing of four registration marks for four color separations to detect crosstrack aberrations according to another embodiment of the invention.
Figure 2:
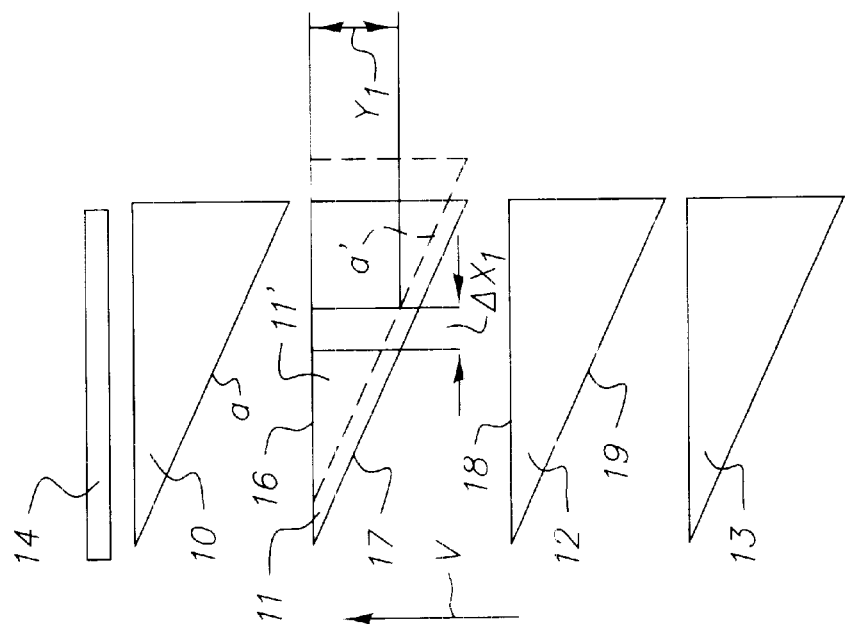
FIG. 2 which is a schematic drawing of four registration marks for four color separations to detect crosstrack aberrations according to an embodiment of the invention.
Figure 4:
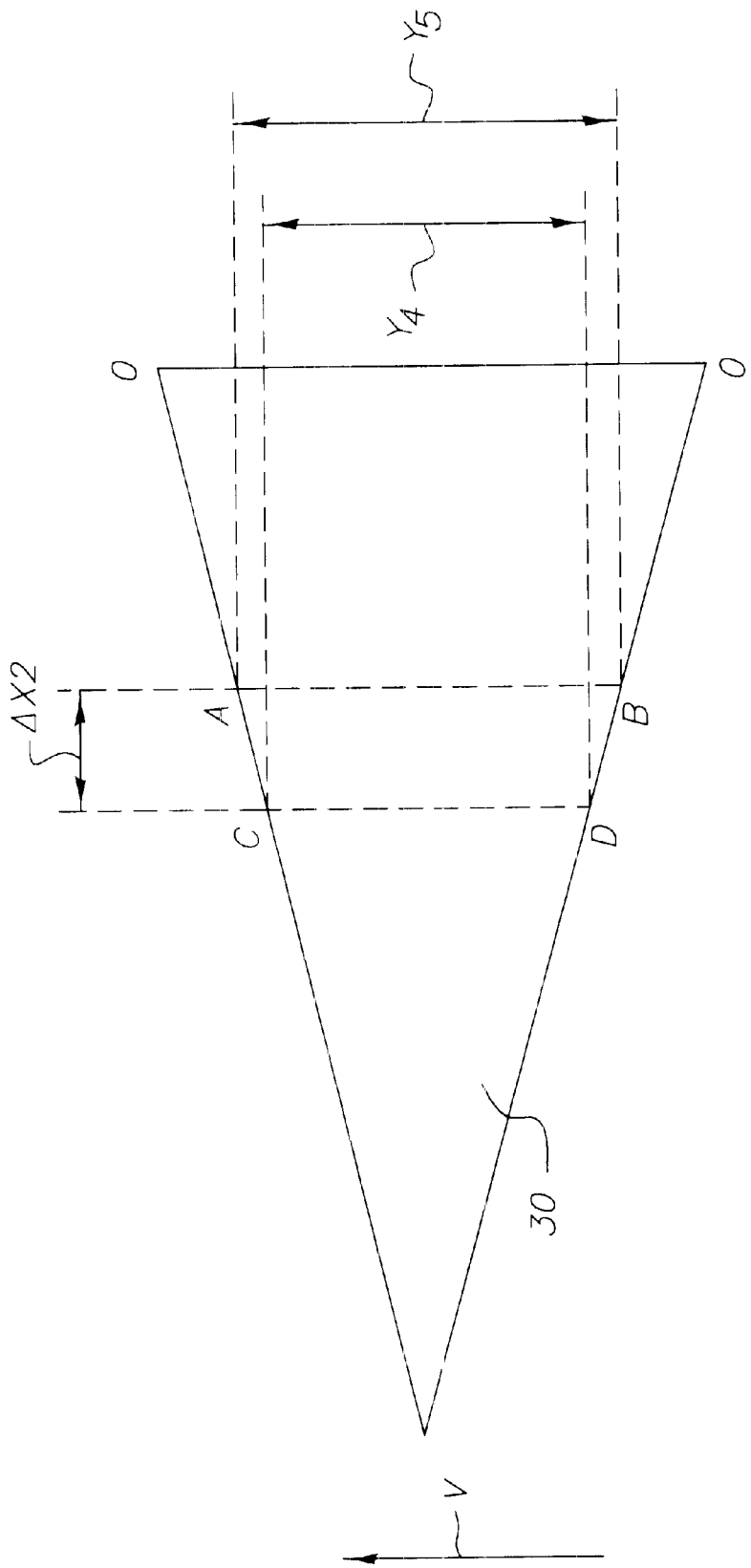
FIG. 4 which is a schematic drawing, on an enlarged scale, of an individual registration mark for a color separation to detect crosstrack aberrations.

In FIGS. 2, 3 and 4, embodiments of registration marks 10, 11, 12, 13, 20, 21, 22, 23 and 30 are described that are suitable for detecting crosstrack aberrations. FIG. 2 illustrates four registration marks 10, 11, 12, and 13 as well as a measurement mark 14 in connection with the present invention. The measurement mark 14 is used as a calibration mark for the calibration of the sensor device 70, but has no meaning for the invention. In this case, the registration marks 10, 11, 12 and 13 according to FIG. 2 are applied to a conveyor belt 40 of a multicolor printing device (not shown). Furthermore, the registration marks 10, 11, 12, 13, 20, 21, 22, 23 and 30 may be applied to the stock. According to FIG. 2, each registration mark 10, 11, 12 and 13 is assigned a color of the color separation, which are usually magenta, cyan, yellow and key or black with four-color printing. The registration marks 10, 11, 12 and 13 are located in the registration mark areas 50 according to FIG. 1.

The geometric shape selected for the registration marks 10, 11, 12 and 13 is a triangle in this case, and other geometric objects with at least one slanted side may be used. The illustrated registration marks 10, 11, 12, and 13 are overscored by a sensor device 70, which is arranged above the conveyor belt 40. In this case, the measurement $y_1$, which is measured from the edge 16 of the registration mark 11 to an edge 17 of the registration mark 11, is shown to explain the mode of action. This distance or interval value $y_1$ is determined with the sensor device 70, by which the light/dark transitions to the edges of the registration marks 10, 11, 12, and 13 are determined. The sensor device 70 detects the edge 16 (Note: it is assumed that the registration mark 10 was already known previously) and, as a result, begins clock pulse-counting processes, which are provided by a central clock pulse generator in the control device 60.

When the registration marks 10, 11, 12, and 13 move on the conveyor belt 40 in the direction of the arrows designated with v, the fixed sensor device 70 detects the edge 17 of the registration mark 11 as the next one. A first counting cycle is concluded with the detection of the edge 17, so that a number of clock pulses are assigned to the distance or interval value $y_1$ from edge 16 to edge 17, which may be converted from the knowledge of the pulse frequency simply into one distance or interval $y_1$. The value of the distance or interval value $y_1$ is formed in a simple way from the number of clock pulses between the edge 16 and the edge 17 in the computer device found within the sensor device 70. Now the sensor device 70 contains the number of clock pulses, which are counted according to the distance or the interval value $y_1$.

Subsequently, the sensor of the sensor device 70 reaches the edge 18 and the edge 19 of the registration mark 12, whereby the described process corresponding to the edges 16 and 17 is carried out again. The values determined and calculated corresponding to the registration mark 12 overwrite those of the registration mark 11 in a memory of the sensor device 70. As a result, the need of a memory in the sensor device 70 remains low. The values stored in the sensor device 70 are transferred to the control device 60. The value $y_1$ is compared in the control device 60 with a target value for precisely arranged registration marks 10, 11, 12 and 13, i.e., without being compared to crosstrack aberrations.

In a first case, the target value and value $y_1$ match within the given tolerances. This means that the position of the registration mark 11 must not be changed; the target value and the actual value of the registration mark 11 match in such a way that basically no chromatic aberrations of the color separations assigned to registration mark 11 on the stock transported by the conveyor belt 40 ultimately occur. In a second case, the target and actual value of the position of the registration mark 11 do not match. This ultimately leads to displacements or aberrations of these assigned color separations in relationship to the other color separations and, consequently, to color errors in printing, such as recognizable horizontal stripes. Thus a correct value is calculated from the target value and the actual value and converted into a number of clock pulses. Value $y_1$ is required for the detection and correction of crosstrack aberrations of the registration mark 11. With a crosstrack aberration of 0, value $y_1$ shows a certain fixed value, which is only dependent upon the lateral lengths of the registration mark 11 as well as upon the impact site of the sensor signals of the sensor device 70, usually without crosstrack aberrations from the median line a of the edge 16. With crosstrack aberrations or crosstrack displacements that are not equal to 0, which can occur for various reasons, such as with temperature expansions of the components of the printing device that are not constant, the interval value $y_1$ is changed linearly with the crosstrack aberration $\Delta x1$, as shown in FIG. 2 by the dotted registration mark 11' and its dotted median line a'. By determination of the value $y_1$, the crosstrack aberration $\Delta x1$ can be definitely determined with the help of a single registration mark 10, 11, 12, 13, 20, 21, 22, 23, or 30, and, as described above, successfully corrected.

To this end, as described, the distance of the edges of registration marks 10, 11, 12, 13, 20, 21, 22, 23, and 30 and the target value of the distance as well as the measurements of the respective registration marks 10, 11, 12, 13, 20, 21, 22, 23, and 30 are required. The method is clearly independent of intrack aberrations, i.e., aberrations in direction of the movement of the conveyor belt 40. In a known method, the distance of registration mark 14 to the registration marks 10, 11, 12, and 13 are often measured and the crosstrack aberration is determined from the measurement results; however, this known method assumes a previous correction of the intrack aberration, contrary to the invention.

FIG. 3 shows another advantageous embodiment of the invention with the registration marks 20, 21, 22 and 23. The principle of the detection and correction of color separations in this case is similar to that in FIG. 2. In this case, exemplary difference values $y_2$ and $y_3$ of two registration marks 20 and 21 are calculated, which are assigned to two different color separations. The process is similar to that according to FIG. 2. The difference is that, in FIG. 3, double the resolution is targeted in comparison to FIG. 2, since with crosstrack aberrations, i.e., horizontal displacements toward the observer plane, e.g., with the registration mark 20, the distance or interval $y_2$ and, with registration mark 21 and the distance or interval $y_3$ linearly change and thus, with the same crosstrack aberration, the change in $y_2$ and $y_3$ is twice as great as the change in value $y_1$ in the example according to FIG. 2.

Moreover, the targeted resolution with detection or measurement is heavily dependent on the selected inner angles of the registration marks 20, 21, 22, and 23; the steeper the angle is, the higher is the resolution. Now the crosstrack aberration is calculated first by the values $y_2$ and $y_3$ and from the knowledge of the lateral lengths of the triangle as registration marks 20, 21, 22, and 23, i.e., from the values $y_2$ or $y_3$ and with the lateral lengths of the triangle as registration marks 20, 21, 22, and 23, the position along the edges of the triangle as registration marks 20, 21, 22, and 23 and ultimately the crosstrack aberration can be determined in the control device 60 with a computer device found within the sensor device 70 by implemented algorithms. By a single registration mark 10, 11, 12, 13, 20, 21, 22, 23 and 30 per color separation, crosstrack aberrations or crosstrack displacements with multicolor printing can be detected or corrected with a single sensor device 70.

FIG. 4 shows an individual registration mark 30 similar to the registration marks 20, 21, 22, and 23 according to FIG. 3 for further clarification of the detection of crosstrack aberrations. In comparison with FIG. 3, an additional dotted line (C-D) has been drawn in the schematic drawing of the interval ratios with the application of a sensor signal, which represents an ideal line at the registration mark 30 without crosstrack aberrations. The registration mark 30 is undesirably displaced in the horizontal direction so that, as a result, the sensor signal of the fixed sensor device 70 does not overscore the dotted line, but rather the line (A-B) lying to the right, first the point A and than the point B on the opposite side of the triangular registration mark 30. It must be mentioned that, as the drawing is only schematic as in the preceding figures, size ratios cannot be gleaned from the figures.

By applying a sensor signal to the registration mark 30, the sensor device 70 determines the light/dark transition at point A and assigns to it zero clock pulses, for example. Then the clock impulse is highly counted down. If the conveyor belt moves in the direction of the arrow, the sensor signal detects the light/dark transition at point B as the next one and assigns the number of clock pulses up to point B to it. From the difference of the number of clock pulses assigned to point B and A, with knowledge of the speed of the conveyor belt 40, to which the registration mark 30 is assigned, and the central pulse frequency of the sensor device 70, the length of the differential line segment $y_5$=B−A can be calculated in a simple way. The differential interval $y_4$=D−C is stored as the target value in a memory of the sensor device 70. Now based on the ratios of $y_4$ and $y_5$ and the lengths OA, OC or OB, OD, the length $\Delta x_2$ that corresponds to the crosstrack aberration can be determined by the mathematical geometric formulae. The correcting process as described above can then be readily carried out.

The invention has been described in detail with particular reference to certain preferred embodiments thereof, but it will be understood that variations and modifications can be effected within the spirit and scope of the invention.

What is claimed is:

1. Method to detect any register errors in the lateral or "crosstrack" direction, in multicolor printing by a sensor device 70 for detection of at least one registration mark (10, 11, 12, 13, 20, 21, 22, 23, and 30) arranged in registration mark areas (50), the method comprising the steps of: detection of sensor values of registration mark areas (50) as an arrangement of triangular registration marks (10, 11, 12, 13, 20, 21, 22, 23, and 30) with a sensor of the sensor device (70), such detecting of sensor values being the counting of clock pulses where each counting cycle of clock pulses for detecting sensor values begins with a first light/dark transition of the first registration marks (10, 20) and each successive light/dark transition of the registration marks (10, 11, 12, 13, 20, 21, 22, 23, and 30) is detected and ends with the last light/dark transition of the last registration mark (13, 23), whereby a color separation is assigned to each triangle during multicolor printing and images of respective differential values are formed from the sensor values.

2. Method according to claim 1, wherein calculation of the crosstrack aberrations, and the corresponding correction values is done by differential values, and correction of the crosstrack aberrations is by the calculated correction values.

3. Method according to claim 2, wherein the correction values are sent to a control device (60), which controls the alignment of a marking device (85) for applying colored images and/or a conveyor belt (40) for correcting the crosstrack aberrations.

4. Device for detecting any crosstrack registration error or aberrations in a multicolor printing apparatus, and correcting such errors, said device comprising: a sensor device (70) for detecting registration marks (10, 11, 12, 13, 20, 21, 22, 23, and 30), in registration mark areas (50) which contain an arrangement of triangles as registration marks (10, 11, 12, 13, 20, 21, 22, 23, and 30), whereby each triangle is assigned a color separation during multicolor printing, said sensor device counting clock pulses and each counting cycle of clock pulses for detecting sensor values begins with a light/dark transition of the first registration marks (10, 20) and each successive light/dark transition of a registration marks (10, 11, 12, 13, 20, 21, 22, 23, and 30) and ends with a light/dark transition of the registration mark (13, 23), and a control device (60) determining crosstrack aberrations therefrom.

5. Device according to claim 4, wherein said control device (60) receives crosstrack aberrations and corrects crosstrack aberrations, which are detected by the sensor device (70).

6. Device according to claim 5, wherein the registration mark areas (50) contain at least one measuring mark (14).

* * * * *